(12) United States Patent
Steiner et al.

(10) Patent No.: US 11,703,125 B2
(45) Date of Patent: Jul. 18, 2023

(54) ELECTRIC DRIVE AXLE FOR A MOTOR VEHICLE HAVING A CENTRAL ACTUATOR ARRANGEMENT

(71) Applicant: MAGNA Powertrain GmbH & Co KG, Lannach (AT)

(72) Inventors: Bernhard Steiner, Viehdorf (AT); Herbert Steindl, Waidhofen an der Ybbs (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 17/696,113

(22) Filed: Mar. 16, 2022

(65) Prior Publication Data
US 2022/0299111 A1    Sep. 22, 2022

(30) Foreign Application Priority Data

Mar. 19, 2021    (DE) .................... 10 2021 202 692.3

(51) Int. Cl.
*F16H 63/34*    (2006.01)
*F16H 63/30*    (2006.01)
*F16H 63/38*    (2006.01)

(52) U.S. Cl.
CPC ....... *F16H 63/3491* (2013.01); *F16H 63/304* (2013.01); *F16H 63/3466* (2013.01); *F16H 63/38* (2013.01); *F16H 2063/3056* (2013.01)

(58) Field of Classification Search
CPC ............... F16H 63/3491; F16H 63/304; F16H 63/3466; F16H 63/38; F16H 2063/3056; Y02T 10/62
See application file for complete search history.

(56) References Cited

U.S. PATENT DOCUMENTS

2017/0234427 A1*  8/2017  Hofkirchner ....... F16H 63/3425
                                                        192/219.5
2018/0135752 A1*  5/2018  Li ....................... F16H 63/3483

FOREIGN PATENT DOCUMENTS

| JP | 2008151308 A | 7/2008 |
| JP | 2009137427 A | 6/2009 |
| WO | 2017051719 A1 | 3/2017 |

* cited by examiner

*Primary Examiner* — Lori Wu
(74) *Attorney, Agent, or Firm* — Dickinson Wright PLLC

(57) ABSTRACT

An electric drive axle for a motor vehicle includes a first half shaft, a second half shaft, a first parking lock unit associated with the first half shaft, and a second parking lock unit associated with the second half shaft. The first parking lock unit and the second parking lock unit are mechanically connected to one another via a connecting linkage. A central actuator arrangement is adjustingly connected to the connecting linkage.

14 Claims, 2 Drawing Sheets

ELECTRIC DRIVE AXLE FOR A MOTOR VEHICLE HAVING A CENTRAL ACTUATOR ARRANGEMENT

CROSS-REFERENCE TO RELATED APPLICATIONS

This application claims priority to DE 10 2021 202 692.3 filed Mar. 19, 2021. The entire disclosure of the above application is incorporated herein by reference.

FIELD OF THE INVENTION

The present invention relates to an electric drive axle for a motor vehicle comprising a first half shaft, a second half shaft, a first parking lock unit, wherein the first parking lock unit is associated with the first half shaft, a second parking lock unit, wherein the second parking lock unit is associated with the second half shaft, wherein the first parking lock unit and the second parking lock unit are mechanically connected to one another via a connecting linkage, and a central actuator arrangement, wherein the actuator arrangement is adjustingly connected to the connecting linkage.

BACKGROUND OF THE INVENTION

This section provides information related to the present disclosure which is not necessarily prior art.

To realise a so-called "standstill management", conventional manual motor vehicles have a handbrake, which is obligatory in all motor vehicles. In the case of manual motor vehicles, the vehicle can furthermore hold itself whilst a gear is engaged, since the clutch between the transmission and the internal combustion engine is normally closed. "Standstill management" is also required in the case of automated motor vehicle transmissions and is generally realised via a parking lock. In this regard, converter automatic transmissions always have an additional parking lock and a parking lock is also provided in automated manual transmissions or dual clutch transmissions, in particular when the friction clutch(es) thereof is (are) normally open. The actuation of the parking lock can be effected purely mechanically by the driver via an operating element ("P position" of a gear lever). It is furthermore possible to actuate the parking lock by pushbutton ("park by wire") or automatically when the engine stops. In these cases, a corresponding, specifically provided actuating mechanism is required in the transmission to actuate the parking lock.

JP 2009-137 427 A has disclosed an electric axle which has two electric motors along the drive axle. Two parking lock devices are also provided which are attached upstream of the reduction transmission in the power flow direction. The reduction transmission is a planetary transmission.

The actuation of the parking rods can also take place in parallel with one another, which, however, leads to only two parallel linear displacements. The connecting rod does not produce a rotational movement.

JP 2008-151 308 A likewise discloses an electric axle with two parking locks which in each case act on the axle of the wheel motor. No engagement into the transmission part of the drive takes place here either.

WO 2017/051 719 A1 discloses a vehicle drive device with two motors, which vehicle drive device is capable of operating a left/right parking lock mechanism with the use of an actuator. The vehicle drive device is constructed with parallel shaft transmission step-down ratios, wherein: a parking gearwheel which is capable of rotating integrally with an input gearwheel shaft is provided on each of the input gearwheel shafts of the two parallel shaft step-down transmissions on the inner side of the input gearwheel shafts of the step-down transmissions. The parking lock engagement takes place linearly via a parking rod.

All necessary actuators generally require significant expenditure and installation space, which need to be reduced.

SUMMARY OF THE INVENTION

This section provides a general summary of the disclosure, and is not a comprehensive disclosure of its full scope or all of its features.

An object of the invention is to provide an electric drive axle for a motor vehicle, which is distinguished by a multifunctional actuating arrangement for two independent parking locks.

This requirement can be met by the subject matter of the present invention. Advantageous embodiments of the present invention are described herein.

The inventive electric drive axle for a motor vehicle has a first parking lock unit, which is associated with a first half shaft of the electric drive axle, and a second parking lock unit, which is associated with a second half shaft of the electric drive axle. According to the invention, the electric axle further includes a central actuator arrangement. The actuator arrangement serves at least to actuate the two parking lock units.

To this end, according to the present invention, the first parking lock unit and the second parking lock unit are mechanically connected to one another via a connecting linkage, wherein the actuator arrangement is adjustingly connected to the connecting linkage.

As a result of the inventive design of the electric axle, two independent parking lock units can be actuated in a simple manner via a central multifunctional actuator arrangement. An electric drive axle which is optimized in terms of installation space and expenditure can be represented in such a way.

The first half shaft of the electric drive axle is preferably drivingly connected or connectable to a first electric machine, and the second half shaft of the electric drive axle is preferably drivingly connected or connectable to a second electric machine.

In a preferred embodiment variant of the present invention, the actuator arrangement has a main actuator, an emergency actuator and a spring energy store, wherein the main actuator is preferably designed as an electric motor and the emergency actuator is preferably designed as a linear magnet.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

DETAILED DESCRIPTION OF THE INVENTION

Figure 1:
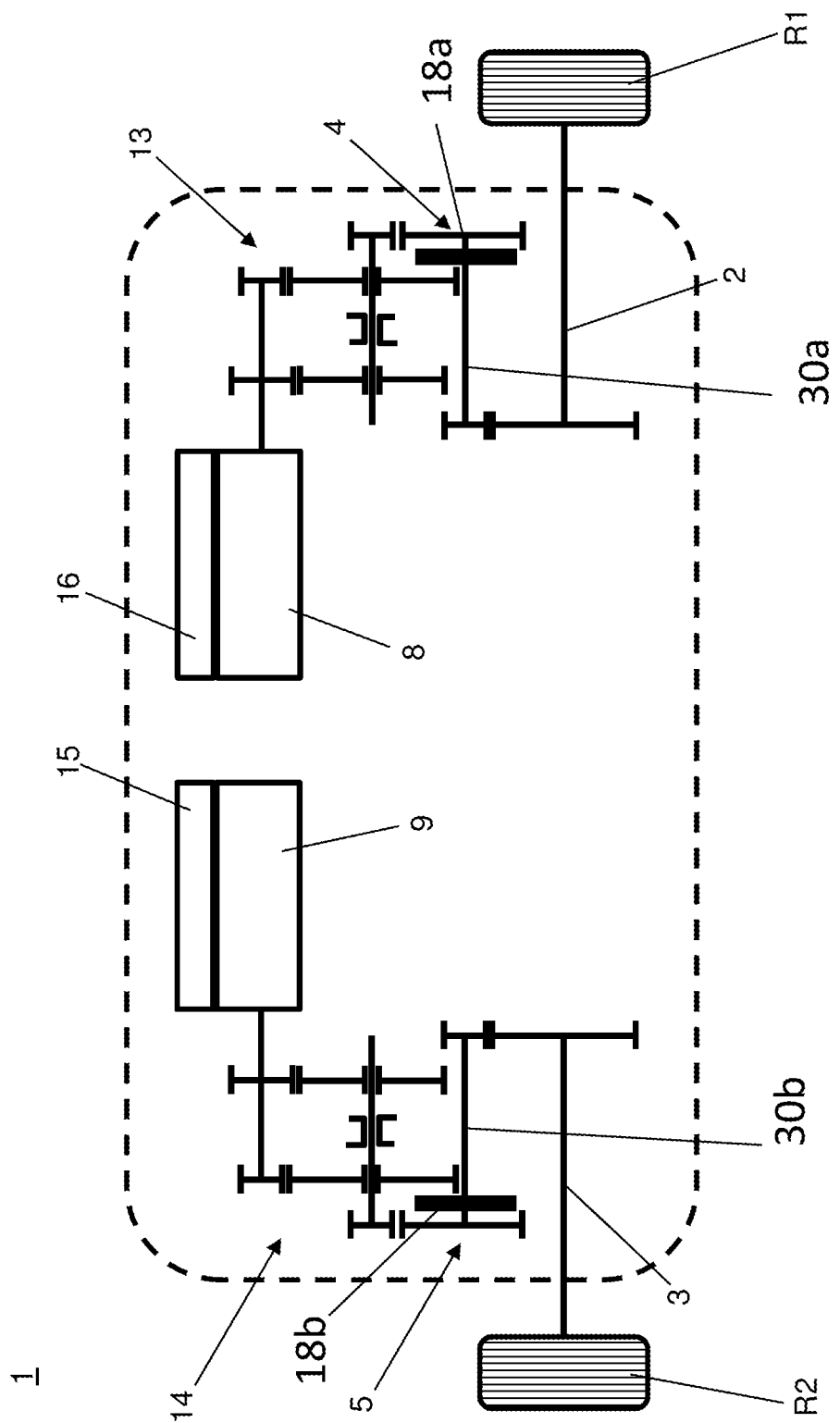
FIG. 1 shows a schematic illustration of an electric drive axle according to the present invention.

A schematic illustration of an exemplary embodiment variant of an electric drive axle 1 for a motor vehicle according to the present invention is illustrated in FIG. 1.

The present embodiment variant relates to a front axle of a motor vehicle, which is designed as an electric drive axle 1 according to the present invention.

The electric drive axle 1 has a first half shaft 2 and a second half shaft 3, wherein a wheel R1, R2 is mounted at one end of the respective half shaft 2, 3 in each case.

The electric drive axle 1 has two electric machines, namely a first electric machine 8 and a second electric machine 9.

The electric drive axle 1 further has power electronics, which have a first inverter 15 and a second inverter 16. The first inverter 15 is functionally connected to the first electric machine 8. The second inverter 16 is functionally connected to the second electric machine 9.

The first electric machine 8 is drivingly connectable to the first half shaft 2 of the electric drive axle 1 via a first transmission 13. A torque generated on the part of the first electric machine 8 can be transmitted to the first half shaft 2 via the first transmission 13, and therefore to the wheel R1 connected to the first half shaft 2.

The second electric machine 9 is drivingly connectable to the second half shaft 3 of the electric drive axle 1 via a second transmission 14. A torque generated on the part of the second electric machine 9 can be transmitted to the second half shaft 3 via the second transmission 14, and therefore to the wheel R2 connected to the second half shaft 3.

The first transmission 13 and the second transmission 14 are each formed as two-gear transmissions with a first gear stage and a second gear stage. The first transmission 13 and the second transmission 14 are designed to be identical in the present exemplary embodiment.

In the two transmissions, a parking lock wheel 18a, 18b is attached in each case on an output shaft 30a, 30b. As a result, the locking function can be implemented directly in the respective transmission, which allows secure locking of the half shafts 2 and 3.

Figure 2:
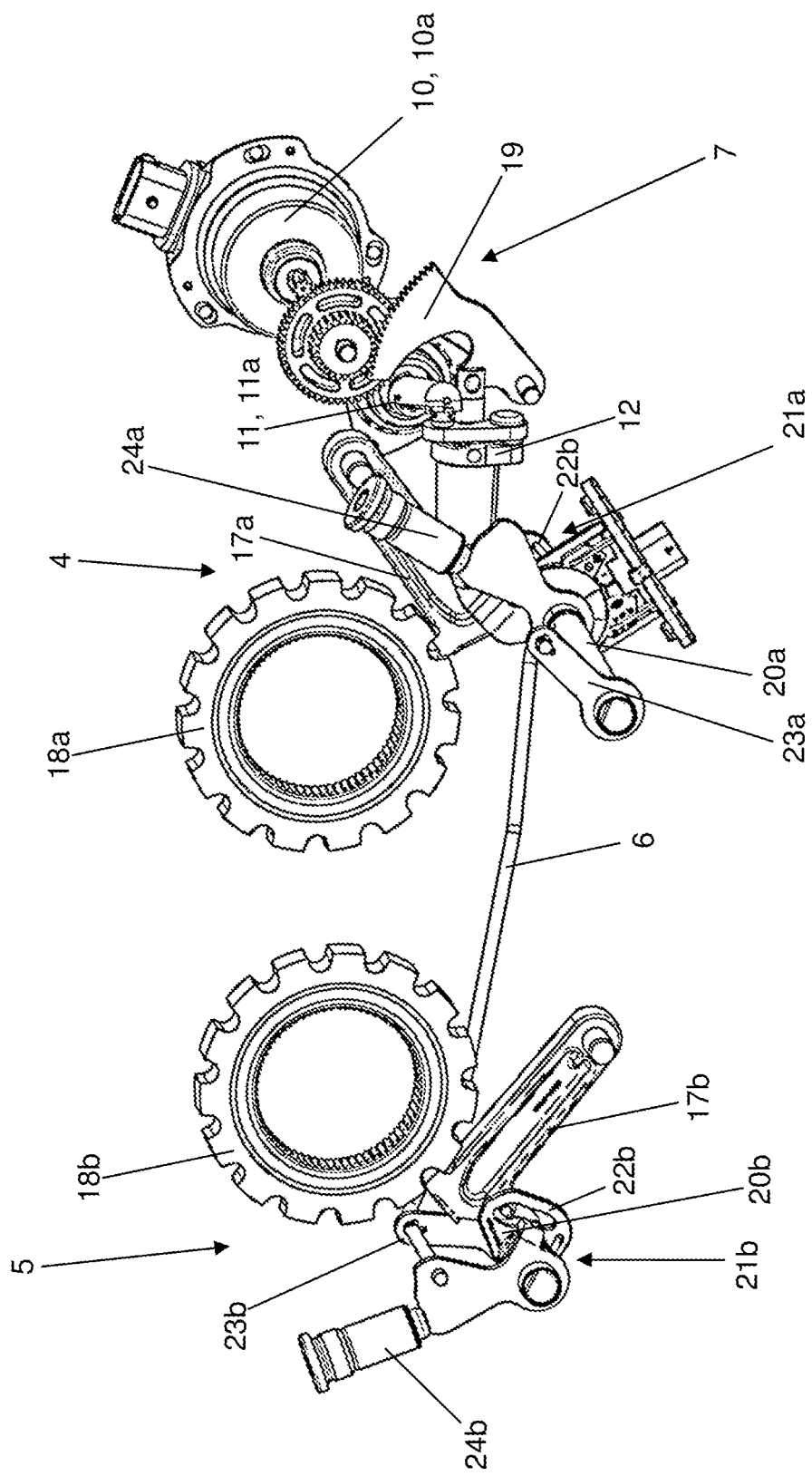
FIG. 2 shows an isometric illustration of a central actuator arrangement for actuating the parking lock units of FIG. 1.

FIG. 2 shows an isometric illustration of a central actuator arrangement 7 for actuating the first parking lock unit 4 and the second parking lock unit 5 of the described electric drive axle 1.

The first parking lock unit 4 and the second parking lock unit 5 are mechanically connected to one another via a connecting linkage 6. The actuator arrangement 7 is adjustingly connected to the connecting linkage 6—the actuation of the connecting linkage 6 is effected centrally via the single actuator arrangement 7. Here, the actuator arrangement is installed on one of the two transmissions, the transmission 13 in the example.

The connecting linkage 6 is connected to the first operating shaft 20a via a first lever 23a and to the second operating shaft 20b via a second lever 23b.

Both operating shafts 20a, 20b are held in position independently of one another by a latching pin 24a, 24b.

The connecting linkage 6 is connected to the levers 23a, 23b via a key-hole connection in each case. The connecting linkage 6 can transmit tensile and shear forces. As a result of the linear pushing and pulling movement, a rotational movement around the operating shafts 20a and 20b is initiated via the levers 23a, 23b. The conversion of a linear movement into a rotational movement saves further installation space.

The first parking lock unit 4 and the second parking lock unit 5 are designed to be identical and have a parking lock detent 17a, 17b in each case, which engages in a respective parking lock wheel 18a, 18b upon actuation of the respective parking lock unit 4, 5.

The actuator arrangement 7 has a main actuator 10, an emergency actuator 11 and a spring energy store 12. The main actuator in the present exemplary embodiment is designed as an electric motor 10a and the emergency actuator is designed as a linear magnet 11a.

The parking lock units 4, 5 are engaged by the electric motor 10 rotating a toothed wheel segment 19. The spring energy store 12, which is arranged between the toothed wheel segment 19 and the connecting linkage 6, is thus moved via a lever arm. The spring energy store 12 can be assumed to be rigid in this case. The spring energy store 12 in turn rotates the connecting linkage 6, which is connected on both sides to an operating shaft 20a, 20b of the respective parking lock unit 4, 5 in each case. A respective cam 22a, 22b, which is rotatably mounted on the respective operating shaft 20a, 20b, is rotated to the respective parking lock detent 17a, 17b of the respective parking lock unit 4, 5 via the respective operating shaft and a respective torsion spring 21a, 21b. The parking lock detent 17a, 17b latches into a respective parking lock wheel 18a, 18b of the respective parking lock unit 4, 5.

The parking lock units 4, 5 are disengaged by the electric motor 10a being operated in the opposite direction of rotation.

The redundant actuation (emergency actuation) is realised via the spring energy store 12 and the linear magnet 11a—the pre-tensioned spring energy store 12 is unlocked with the aid of the linear magnet 11a. The respective cam 22a, 22b then actuates the respective parking lock detent 17a, 17b.

LIST OF REFERENCE DESIGNATIONS

1 Electric drive axle
2 First half shaft
3 Second half shaft
4 First parking lock unit
5 Second parking lock unit
6 Connecting linkage
7 Actuator arrangement
8 First electric machine
9 Second electric machine
10 Main actuator
10a Electric motor
11 Emergency actuator
11a Linear magnet
12 Spring energy store
13 First transmission
14 Second transmission
15 First inverter
16 Second inverter
17a, b Parking lock detent
18a, b Parking lock wheel
19 Toothed wheel segment
20a, b Operating shaft
21a, b Torsion spring
22a, b Cam
23a, b Lever
24a, b Latching pin
30a, 30b Output shaft
R1, R2 Wheel

What is claimed is:

1. An electric drive axle for a motor vehicle comprising
a first half shaft,
a second half shaft,
a first parking lock unit in a first transmission, wherein the first parking lock unit is associated with the first half shaft,
a second parking lock unit in a second transmission, wherein the second parking lock unit is associated with the second half shaft,
wherein the first parking lock unit and the second parking lock unit are mechanically connected to one another via a connecting linkage which is connected via a first lever to a first operating shaft and via a second lever to a second operating shaft, wherein the first lever rotates to actuate the first operating shaft and the second lever rotates to actuate the second operating shaft, and
a central actuator arrangement, wherein the actuator arrangement is adjustingly connected to the connecting linkage.

2. The electric drive axle according to claim 1, wherein the first half shaft is drivingly connected or connectable to a first electric machine and the second half shaft is drivingly connected or connectable to a second electric machine.

3. The electric drive axle according to claim 1, wherein the actuator arrangement has a main actuator, an emergency actuator, and a spring energy store.

4. The electric drive axle according to claim 3, wherein the main actuator is an electric motor, and the emergency actuator is a linear magnet.

5. The electric drive axle according to claim 1, wherein the first and second parking lock units each include a parking lock wheel attached in each case to an output shaft, wherein a locking function can be implemented directly in the respective transmission.

6. The electric drive axle according to claim 1, wherein the actuator arrangement is installed on one of the first and second transmissions.

7. The electric drive axle according to claim 1, wherein the first and second operating shafts are held in position independently of one another by a latching pin.

8. The electric drive axle according to claim 1, wherein the connecting linkage is connected to the first and second levers via a key-hole connection.

9. The electric drive axle according to claim 1, wherein a rotational movement around the operating shafts is initiated via pushing and pulling movement of the levers.

10. An electric drive axle for a motor vehicle comprising
a first half shaft,
a second half shaft,
a first parking lock unit in a first transmission, wherein the first parking lock unit is associated with the first half shaft,
a second parking lock unit in a second transmission, wherein the second parking lock unit is associated with the second half shaft,
wherein the first parking lock unit and the second parking lock unit are mechanically connected to one another via a connecting linkage which is connected via a first lever to a first operating shaft and via a second lever to a second operating shaft, and
a central actuator arrangement, wherein the actuator arrangement is adjustingly connected to the connecting linkage;
wherein the actuator arrangement has a main actuator, an emergency actuator, and a spring energy store; and
wherein the spring energy store is arranged between a toothed wheel segment actuated by the electric motor and the connecting linkage.

11. The electric drive axle according to claim 10, wherein the spring energy store rotates the connecting linkage in response to actuation by the electric motor.

12. The electric drive axle according to claim 11, wherein, in response to movement of the connecting linkage, a respective cam is rotated to a respective parking lock detent of the respective parking lock unit via the respective operating shaft and a respective torsion spring, wherein the respective parking lock detent latches into a respective parking lock wheel of the respective parking lock unit.

13. The electric drive axle according to claim 11, wherein emergency actuation occurs via the spring energy store and the linear magnet, wherein the spring energy store is pretensioned and unlocked via the linear magnet such that the respective cam actuates the respective parking lock detent.

14. An electric drive axle for a motor vehicle comprising
a first half shaft,
a second half shaft,
a first parking lock unit in a first transmission, wherein the first parking lock unit is associated with the first half shaft,
a second parking lock unit in a second transmission, wherein the second parking lock unit is associated with the second half shaft,
wherein the first parking lock unit and the second parking lock unit are mechanically connected to one another via a connecting linkage which is connected via a first lever to a first operating shaft and via a second lever to a second operating shaft, and
a central actuator arrangement, wherein the actuator arrangement is adjustingly connected to the connecting linkage;
wherein the actuator arrangement has a spring energy store that is arranged between a toothed wheel segment actuated by the electric motor and the connecting linkage.

* * * * *